(12) United States Patent
Lindbo et al.

(10) Patent No.: US 11,807,419 B2
(45) Date of Patent: Nov. 7, 2023

(54) GOODS DELIVERY SYSTEMS

(71) Applicant: OCADO INNOVATION LIMITED, Hatfield (GB)

(72) Inventors: Lars Sverker Ture Lindbo, Hatfield (GB); Paul Stewart, Hatfield (GB); Andrew John Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 17/196,259

(22) Filed: Mar. 9, 2021

(65) Prior Publication Data

US 2021/0188484 A1    Jun. 24, 2021

Related U.S. Application Data

(63) Continuation of application No. 16/080,521, filed as application No. PCT/EP2017/054567 on Feb. 28, 2017, now Pat. No. 11,021,297.

(30) Foreign Application Priority Data

Feb. 29, 2016   (GB) ...................... 1603517

(51) Int. Cl.
| | | |
|---|---|---|
| *B65D 21/032* | (2006.01) | |
| *B65D 25/00* | (2006.01) | |
| *B65D 6/06* | (2006.01) | |
| *B65D 21/02* | (2006.01) | |

(52) U.S. Cl.
CPC ............ *B65D 25/005* (2013.01); *B65D 11/12* (2013.01); *B65D 21/0209* (2013.01); *Y02W 30/80* (2015.05)

(58) Field of Classification Search
CPC .. B65D 25/005; B65D 11/12; B65D 21/0209; B65D 21/086; B65D 21/0212; B65D 21/0215
See application file for complete search history.

(56) References Cited

U.S. PATENT DOCUMENTS

| | | |
|---|---|---|
| 2,081,821 A | 5/1937 | Kiff |
| 3,003,839 A | 10/1961 | Eli et al. |
| 3,421,801 A | 1/1969 | Carpenter et al. |
| (Continued) | | |

FOREIGN PATENT DOCUMENTS

| | | |
|---|---|---|
| CH | 239917 A | 11/1945 |
| CN | 202864064 U | 4/2013 |
| (Continued) | | |

OTHER PUBLICATIONS

Combined Search and Examination Report under Sections 17 and 18(3) issued by the Intellectual Property Office in corresponding British Application No. 1703170.9 dated Jun. 9, 2017 (7 pages).

(Continued)

*Primary Examiner* — Stephen J Castellano
(74) *Attorney, Agent, or Firm* — BUCHANAN INGERSOLL & ROONEY PC

(57) ABSTRACT

The present invention relates to containers which can be stacked one on top of another whilst still permitting easy access to the contents of any container within the stack without the need for de-stacking. The contents of the containers remain secured within the container.

12 Claims, 12 Drawing Sheets

(56) References Cited

U.S. PATENT DOCUMENTS

Figure 1:
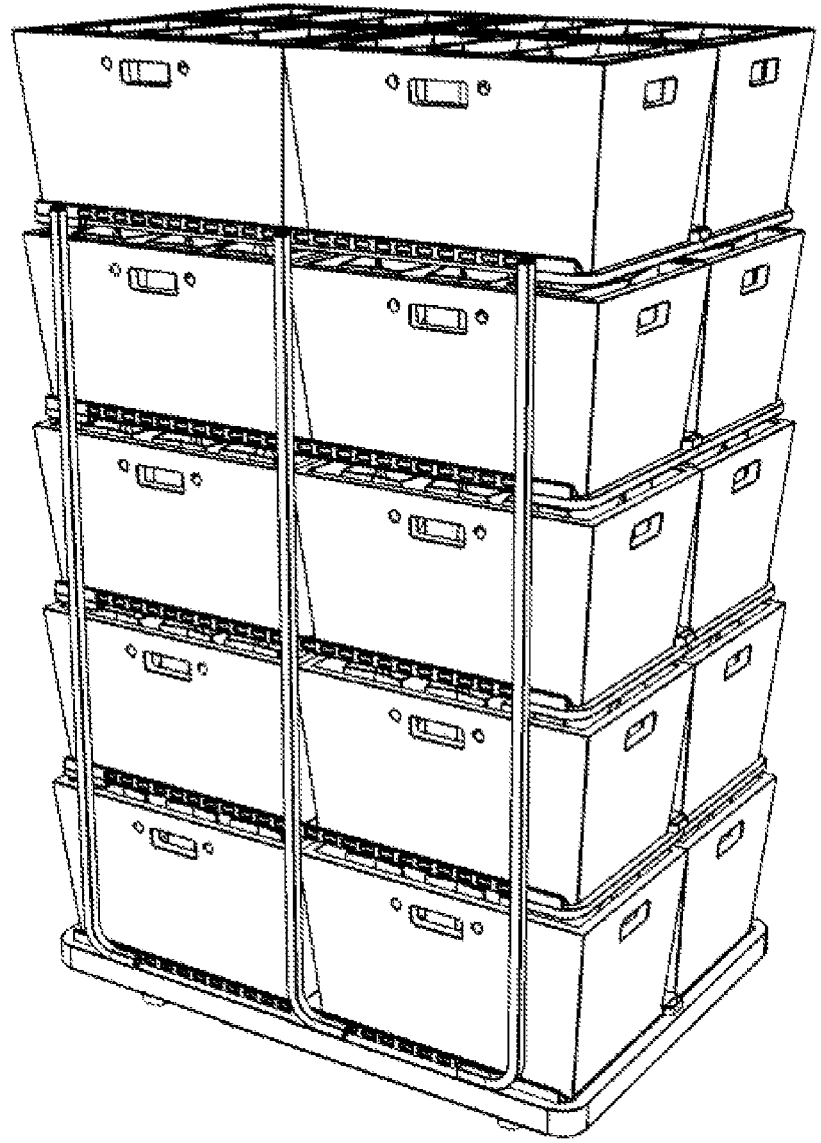

| | | | |
|---|---|---|---|
| 3,642,337 | A | 2/1972 | Manheim |
| 3,918,781 | A | 11/1975 | Paris |
| 4,266,668 | A | 5/1981 | Paek |
| 4,413,867 | A | 11/1983 | Mosebrook et al. |
| 4,519,503 | A | 5/1985 | Wilson |
| 4,561,554 | A | 12/1985 | Swincicki et al. |
| 4,566,588 | A | 1/1986 | Kataczynski |
| 4,813,521 | A | 3/1989 | Goldstone |
| 4,974,746 | A | 12/1990 | Dickinson |
| 5,123,533 | A | 6/1992 | Uitz |
| 5,285,900 | A | 2/1994 | Swingler |
| 6,012,582 | A | 1/2000 | Haygeman et al. |
| 6,431,580 | B1 | 8/2002 | Kady |
| 6,550,794 | B1 | 4/2003 | Spindel et al. |
| 7,134,673 | B2 | 11/2006 | Ferraro et al. |
| 7,249,674 | B2 | 7/2007 | Mu et al. |
| 8,454,285 | B2 | 6/2013 | Jackson et al. |
| 8,485,134 | B2 | 7/2013 | Dorsey |
| 9,527,205 | B1 | 12/2016 | Lin |
| 11,352,170 | B2 | 6/2022 | De |
| 2005/0224384 | A1 | 10/2005 | Sands et al. |
| 2006/0186187 | A1 | 8/2006 | Laher |
| 2007/0084864 | A1 | 4/2007 | Thrush et al. |
| 2009/0007853 | A1* | 1/2009 | Johnson ............... A22B 3/086 452/57 |
| 2010/0006467 | A1 | 1/2010 | Joseph et al. |
| 2012/0186528 | A1 | 7/2012 | Dorsey |
| 2014/0033956 | A1 | 2/2014 | Kelly et al. |
| 2015/0021329 | A1 | 1/2015 | Darmon |
| 2015/0232238 | A1 | 8/2015 | Wu |
| 2016/0272369 | A1 | 9/2016 | Hsu |
| 2017/0150813 | A1 | 6/2017 | Stares et al. |
| 2019/0062000 | A1 | 2/2019 | Lindbo et al. |

FOREIGN PATENT DOCUMENTS

| | | |
|---|---|---|
| CN | 204641811 U | 9/2015 |
| CN | 107215527 A | 9/2017 |
| DE | 3610027 A1 | 10/1987 |
| DE | 202007000176 U1 | 4/2007 |
| DE | 202007001796.0 U1 | 4/2007 |
| DE | 102012016522 A1 | 3/2013 |
| DE | 102012104902 A1 | 12/2013 |
| DE | 202014001386 U1 | 2/2014 |
| DE | 202015103273 U1 | 7/2015 |
| EP | 0524659 A1 | 1/1993 |
| EP | 0791312 A2 | 8/1997 |
| EP | 1690796 A1 | 8/2006 |
| EP | 3423365 B1 | 12/2020 |
| FR | 2407137 A1 | 5/1979 |
| GB | 2114544 A | 8/1983 |
| GB | 2145063 A | 3/1985 |
| GB | 2280892 A | 2/1995 |
| JP | S55117933 U | 8/1980 |
| JP | 2008253316 A | 10/2008 |
| JP | 2009001313 A | 1/2009 |
| JP | 2014051321 A | 3/2014 |
| JP | 2018110666 A | 7/2018 |
| KR | 100779058 B1 | 11/2007 |
| KR | 20130005611 U | 9/2013 |
| KR | 10134477 B1 | 5/2014 |
| WO | 2004071906 A2 | 8/2004 |
| WO | 2014072442 A1 | 5/2014 |
| WO | 2014076507 A2 | 5/2014 |
| WO | 2014124479 A1 | 8/2014 |
| WO | 2015124562 A1 | 8/2015 |
| WO | 2015134067 A1 | 9/2015 |

OTHER PUBLICATIONS

Examination Report under Section 18(3) issued by the Intellectual Property Office in corresponding British Application No. 1703170.9 dated Jul. 8, 2019 (2 pages).
Examination Report under Section 18(3) issued by the Intellectual Property Office in corresponding British Application No. 1703170.9 dated Apr. 30, 2020 (2 pages).
Examination Report under Section 18(3) issued by the Intellectual Property Office in corresponding British Application No. 1703170.9 dated Jul. 10, 2020 (2 pages).
Examination Report under Section 18(3) issued by the Intellectual Property Office in corresponding British Application No. 1703170.9 dated Jan. 8, 2020 (3 pages).
PCT International Preliminary Report on Patentability (IPRP) and Written Opinion dated Mar. 27, 2017 in corresponding International Application No. PCT/EP2017/054567 (12 pages).
Intellectual Property Office Search Report dated Jun. 8, 2017.
International Search Report (PCT/ISA/210) dated Mar. 27, 2017, by the European Patent Office as the International Searching Authority for International Application No. PCT/EP2017/054567.
Written Opinion (PCT/ISA/237) dated Mar. 27, 2017, by the European Patent Office as the International Searching Authority for International Application No. PCT/EP2017/054567.
"Computerwelt & Transform", Knapp AG: E-Grocer-Losung Mr Tudespensa.com, Mar. 4, 2015, 3 pages.
"Delivering the Best Platform for Online Grocery", Ocado Group, 2015, 202 pages.
"Materialfluss LT. Manager", Lager- & Kommissioniertechnik: Direkt in die Einkaufstasche—materialfluss Online, Jun. 16, 2015, 5 pages.
"The Wayback Machine", Knapp AG—Material Handling and Logistics Solutions, Mar. 17, 2015, 2 pages.
"Goods to Person" Knapp AG—Material Handling and Logistics Solutions, Mar. 17, 2015, 1 Page.
Communication of a Notice of Opposition dated Sep. 20, 2021, issued in the corresponding European Patent Application No. 17707847.4, 61 pages.
Communication of Notices of Opposition (R. 79(1) EPC) dated Sep. 24, 2021, issued in the corresponding European Patent Application No. 17707847.4, 1 page.
Assorted Examples of Containers of D62-D74. (6 pages).
Bankers Box Basics Stackable Storage Drawers A4 Cardboard Blue. (5 pages).
Bankers Box System Schubladenarchiv (Fellowes Bankers Box System Storage Drawer-Foolscap/Folio/Legal, Pack of 5. (4 pages).
Drawer—Wikipedia article of Oct. 31, 2015. (3 pages).
Office Action (Brief Communication) dated Jun. 20, 2023, by the European Patent Office in corresponding European Patent Application No. 17707847.4. (6 pages).
Office Action dated Jun. 21, 2023, by the European Patent Office in corresponding European Patent Application No. 17707847.4. (10 pages).
Rotho Country Schubladenbox. (11 pages).
Rotho Systemix Schubladenbox. (9 pages).
Sliding (motion)—Wikipedia article of Sep. 28, 2012. (1 page).
Sworn Statement—Declaration of Uwe Gruenbeck. (3 pages).
Table with Plain Text Versions of the Website Addresses for D62-D74. (4 pages).

* cited by examiner

GOODS DELIVERY SYSTEMS

This application is a continuation of application Ser. No. 16/080,521 filed 28 Aug. 2018, now U.S. Pat. No. 11,021,297 which is the national stage (Rule 371) of international application No. PCT/EP2017/054567 filed 28 Feb. 2017.

The present invention relates to re-usable containers which can be stacked one on top of another whilst still permitting easy access to the contents of any container within the stack without the need for de-stacking and the use of these containers in goods delivery systems.

A range of different types of either fully or semi-automated order processing and fulfillment systems are known.

In one known type of order picking system, a customer's order is assembled into one or more tote, bin, box, bag, crate, sac, pouch or some other re-usable container.

Each re-usable container may contain one or more item or bag for the same customer as would be the case in online grocery retail.

Alternatively each re-usable container may contain one or more parcel for the same or different recipients on the same route, as would the case for general merchandise parcel distribution.

After all the re-usable containers for a single delivery vehicle have been filled, they are loaded onto said delivery vehicle.

The re-usable containers are loaded either directly into or onto a delivery vehicle at the order picking facility or alternatively in what is hereinafter known as a hub-and spoke system the re-usable containers are loaded onto an intermediary carrier, such as a pallet, dolly or roll cage.

The intermediary carriers are loaded into or onto a distribution vehicle and transported to a subsidiary site where the re-usable containers are unloaded from the intermediary carrier and transferred to one or more delivery vehicle.

In either system the reusable-containers are usually loaded manually onto racking or shelving located within the delivery vehicle. Although this method has the benefit of being flexible for reusable-containers of different sizes, it is labour intensive and requires the delivery vehicles to occupy a loading dock at the order picking facility, or the subsidiary site for a relatively lengthy dwell time.

In conventional handling systems roll cages are employed to minimize the dwell time in a loading dock. The roll cages can be pre-filled away from the loading dock and stored waiting for the right vehicle to be presented at a loading dock.

The entire roll cage or its individual contents can then be more rapidly loaded into the vehicle.

In another conventional handling system the reusable containers are stacked on top of each other on dollies. The stacks with or without the dollies can then be more rapidly loaded into a delivery vehicle however this system creates problems when deliveries need to be made out of a pre-determined sequence.

Further disadvantages of this system include the need to store the empty containers generated after each delivery within the delivery vehicle, also it becomes increasingly difficult to properly secure the remaining load as some stacks are more or less depleted.

A yet further disadvantage of all of these systems which makes them particularly ill suited to a hub-and-spoke system, is that the re-usable containers must first be loaded onto or into pallets, dollies or roll cages at the order-picking facility then unloaded and re-loaded onto or into individual delivery vehicles at the subsidiary site which increases costs, handling times and the potential for errors in the orders and damage to the goods.

A need exists for an efficient order processing system for picking, filling, storing and distributing orders that avoids the need for repeatedly stacking and de-staking re-usable containers and keeps loading dock dwell times to a minimum.

The present invention relates to a re-usable, stackable container for use in a goods handling system wherein the interior of the container is accessible when two or more containers are stacked together.

In a preferred aspect the container comprises 5 closed sides.

In another preferred aspect the container has an inner part slidably engaged within an outer part to allow the container to be opened and closed.

In a further preferred aspect 1 or more side of the inner part has an opening to allow access to the interior of the inner part.

In another preferred aspect one or more side of the container is movable to allow access to the interior of the container.

In another aspect the invention relates to a single movable unit comprising 2 or more stacks of containers.

In a preferred aspect the single movable unit further comprises one or more dolly.

In another preferred aspect the stacks are secured together by one or more strap.

In another preferred aspect two or more dollies are releasably locked together.

In a further aspect the invention relates to goods handling system comprising a multiplicity of re-usable, stackable containers.

In further aspect the invention relates to a goods handling system comprising single movable unit.

In this way, the present invention overcomes the problems of the prior art and provides an efficient goods handling system which avoids the need for repeated stacking and de-stacking of containers.

Figure 2:

The invention will now be described with reference to the accompanying diagrammatic drawings in which:

FIG. 1: is a schematic perspective view of a conventional roll cage containing four stacks of re-usable containers FIG. 2: is a schematic perspective view of a conventional delivery vehicle showing the arrangement of four conventional roll cages within the vehicle.

Figure 3A:
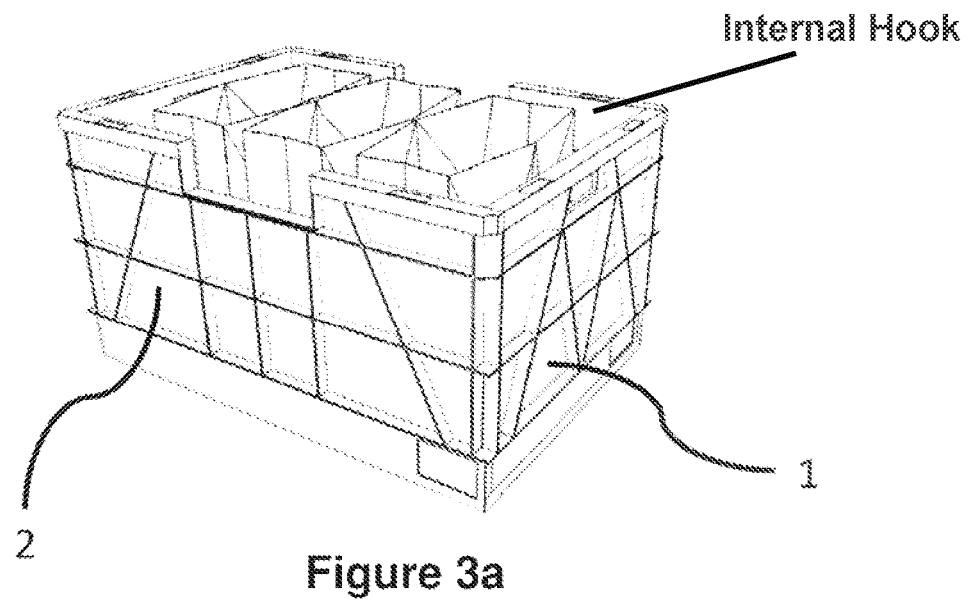
Figure 3B:
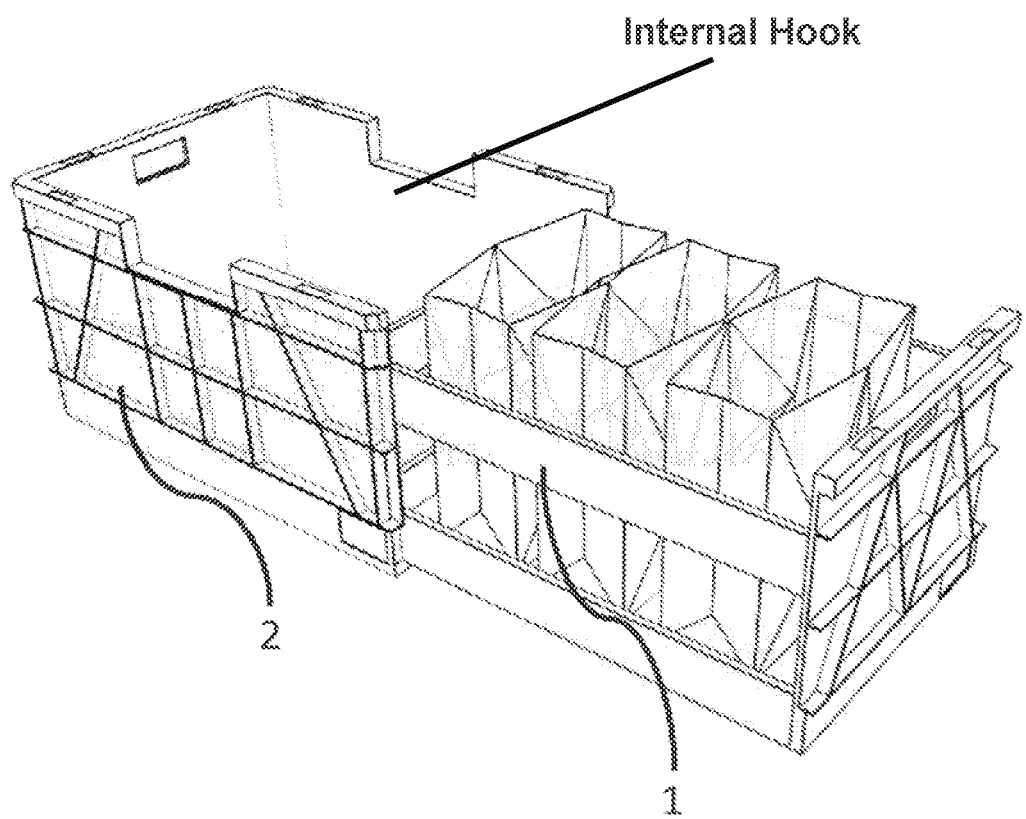

FIGS. 3a and 3b: are a schematic perspective views of a re-usable container according to a first embodiment of the present invention having an inner part 1 and an outer part 2 wherein the inner portion is adapted to slide into and out of the outer part to close and open like a drawer.

Figure 3C:
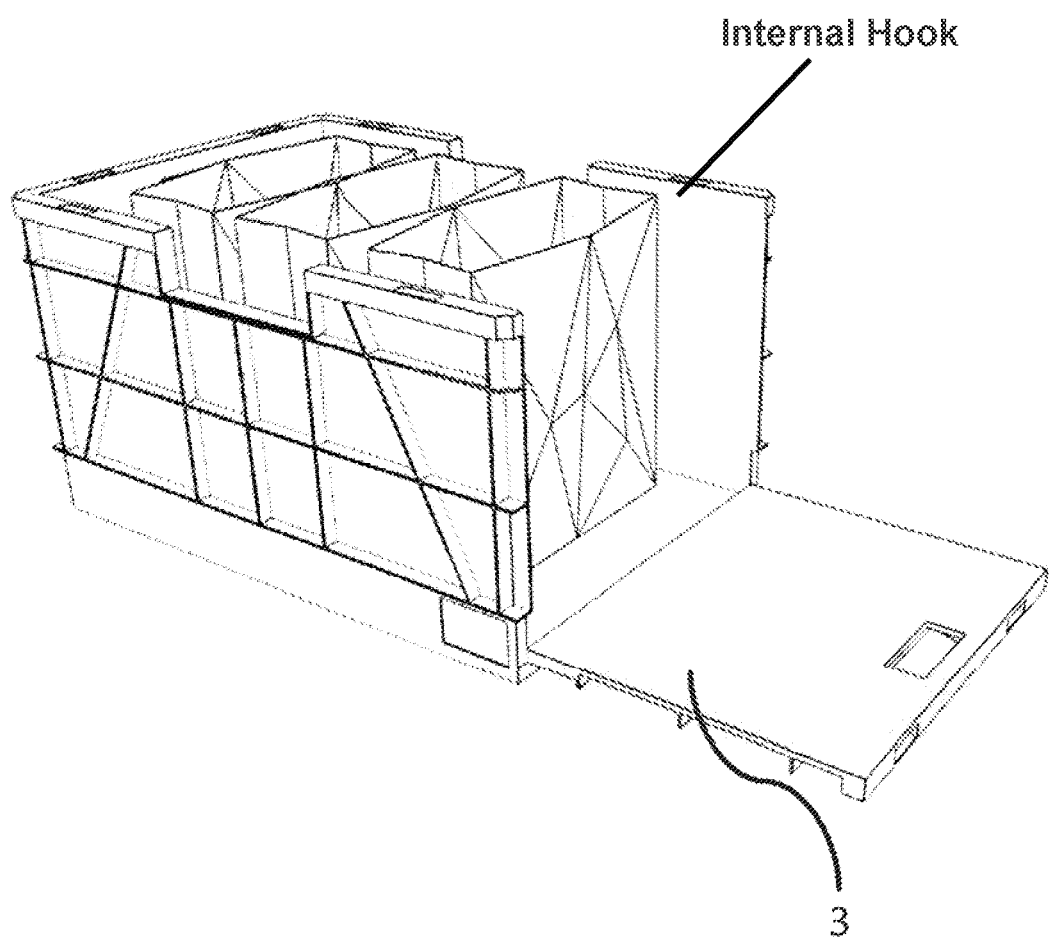

FIG. 3c: is a schematic perspective view of a re-usable container according to a second embodiment of the present invention having a movable side 3.

Figure 4:
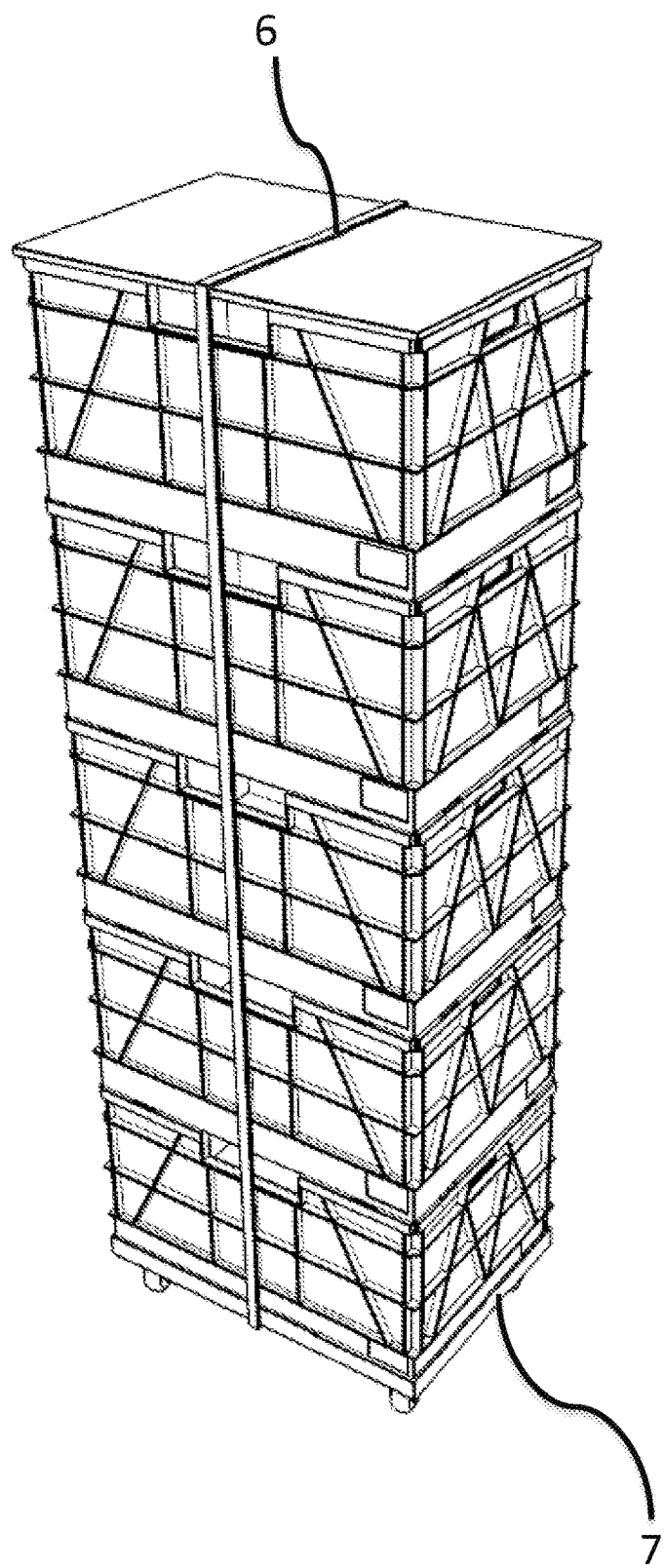

FIG. 4: is a schematic perspective view of a stack of five containers according to the present invention loaded on a dolly 7 and secured by a strap 6.

Figure 5:
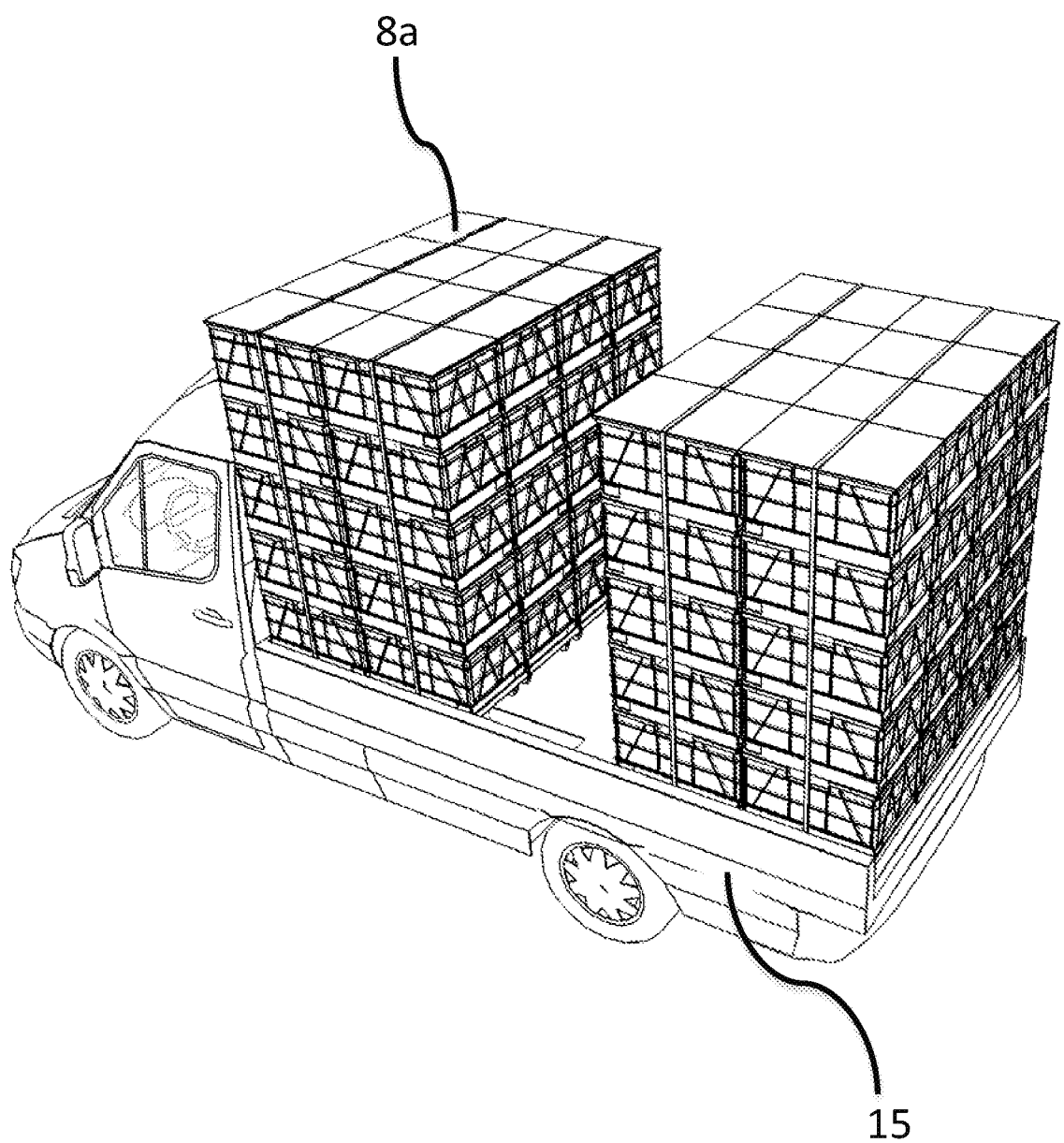
Figure 6:
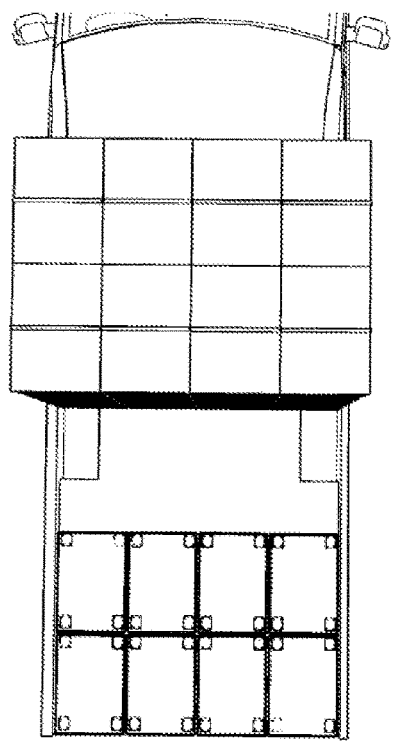
Figure 7:
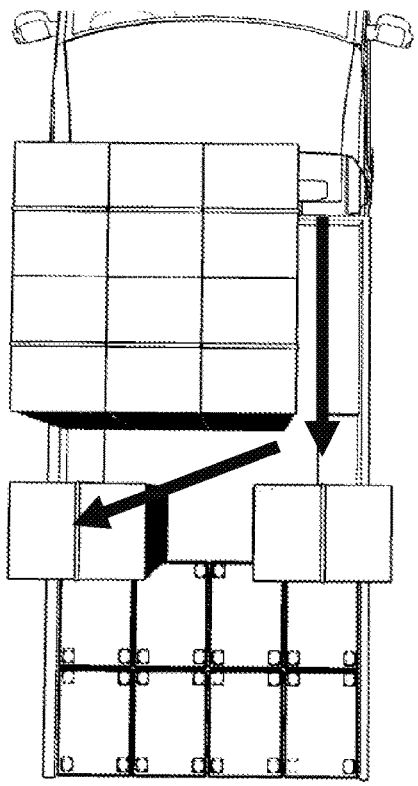
Figure 8:
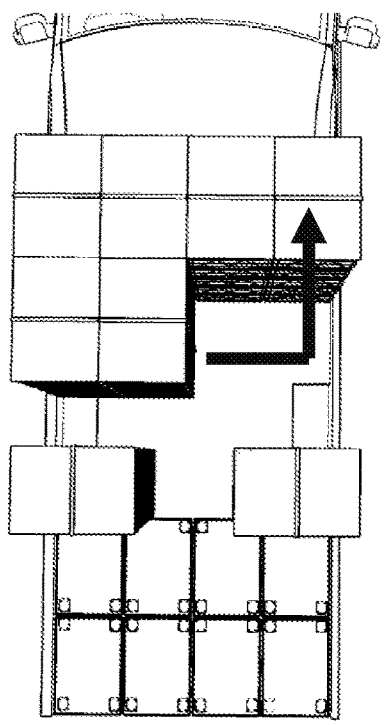
Figure 9:
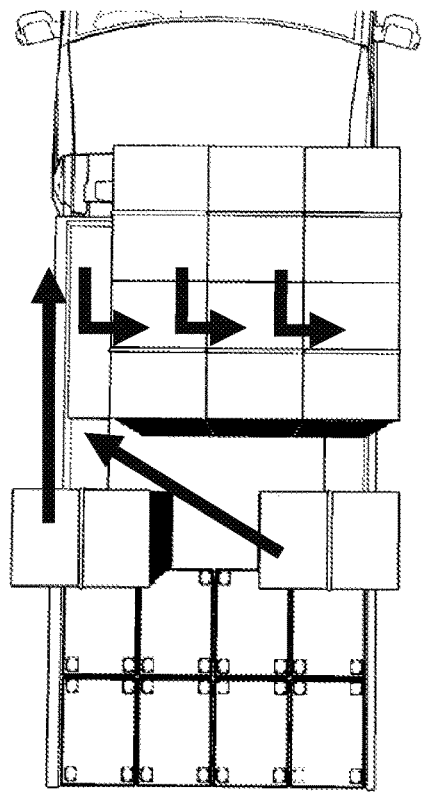

FIG. 5: is a schematic perspective view showing how multiple loaded dollies may be arranged in a delivery vehicle.

FIGS. 6-9: are a series of schematic perspective views of a delivery vehicle showing how the dollies may be arranged and re-arranged inside the delivery vehicle to allow access to each of eight stacks.

Figure 10:
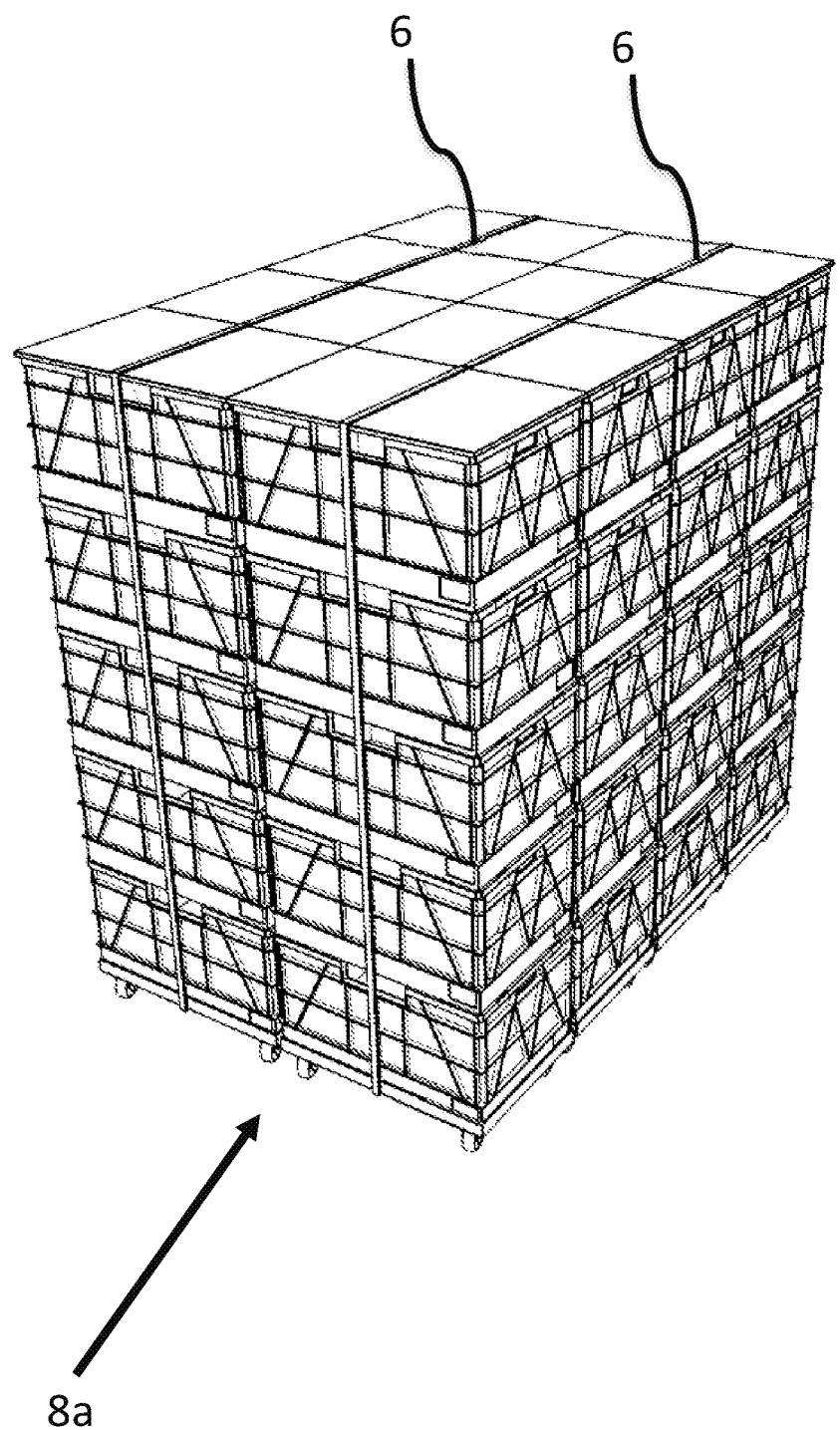

FIG. 10: is a schematic perspective view of four dollies each loaded with five containers and secured together by straps 6 (and having a mechanism not shown for locking the dollies together) to form a single, stable, movable unit 8a.

Figure 11:
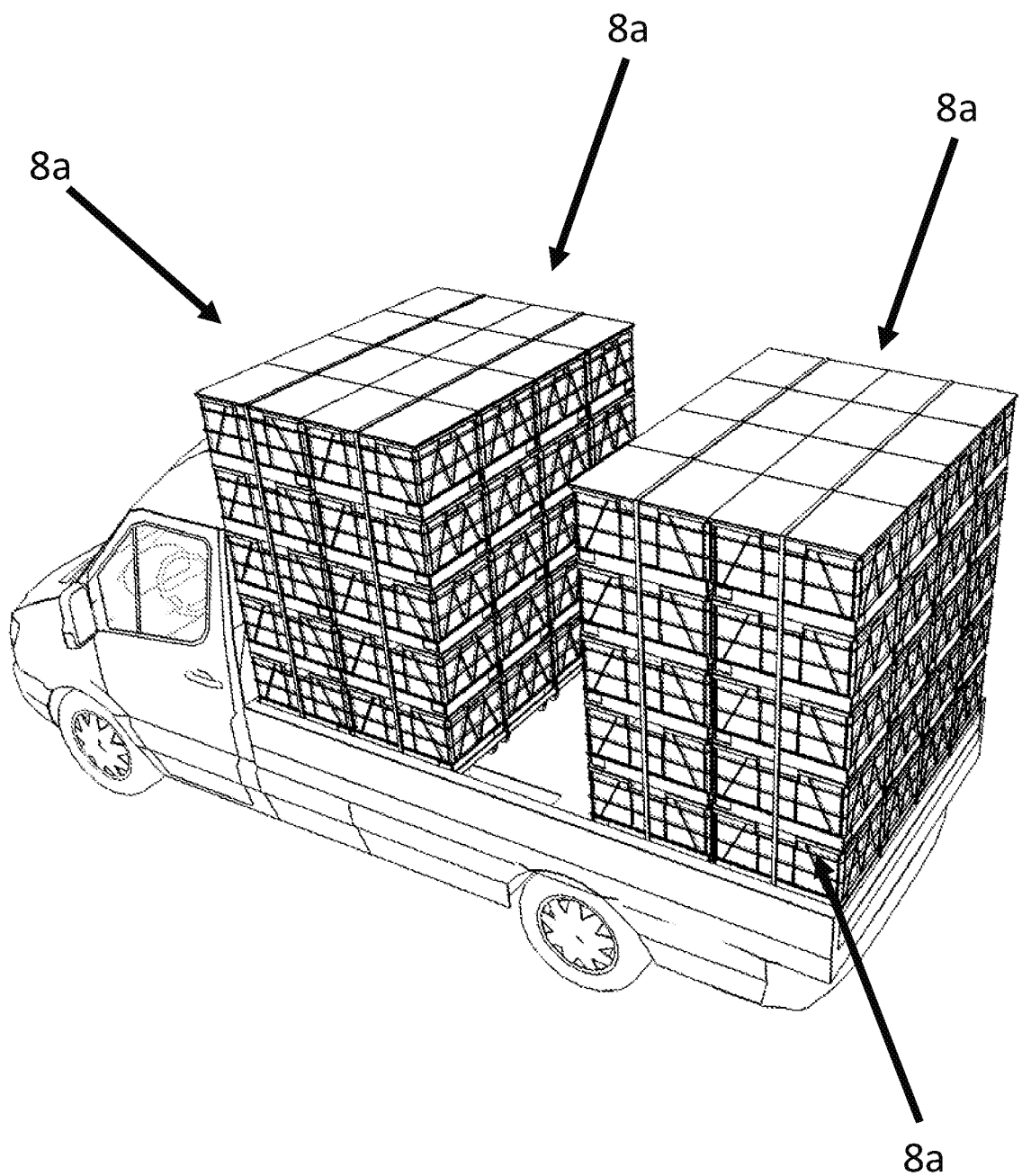

FIG. 11: is a schematic perspective view of a distribution vehicle loaded with a multiplicity of the units 8a depicted in FIG. 10.

Figure 12:
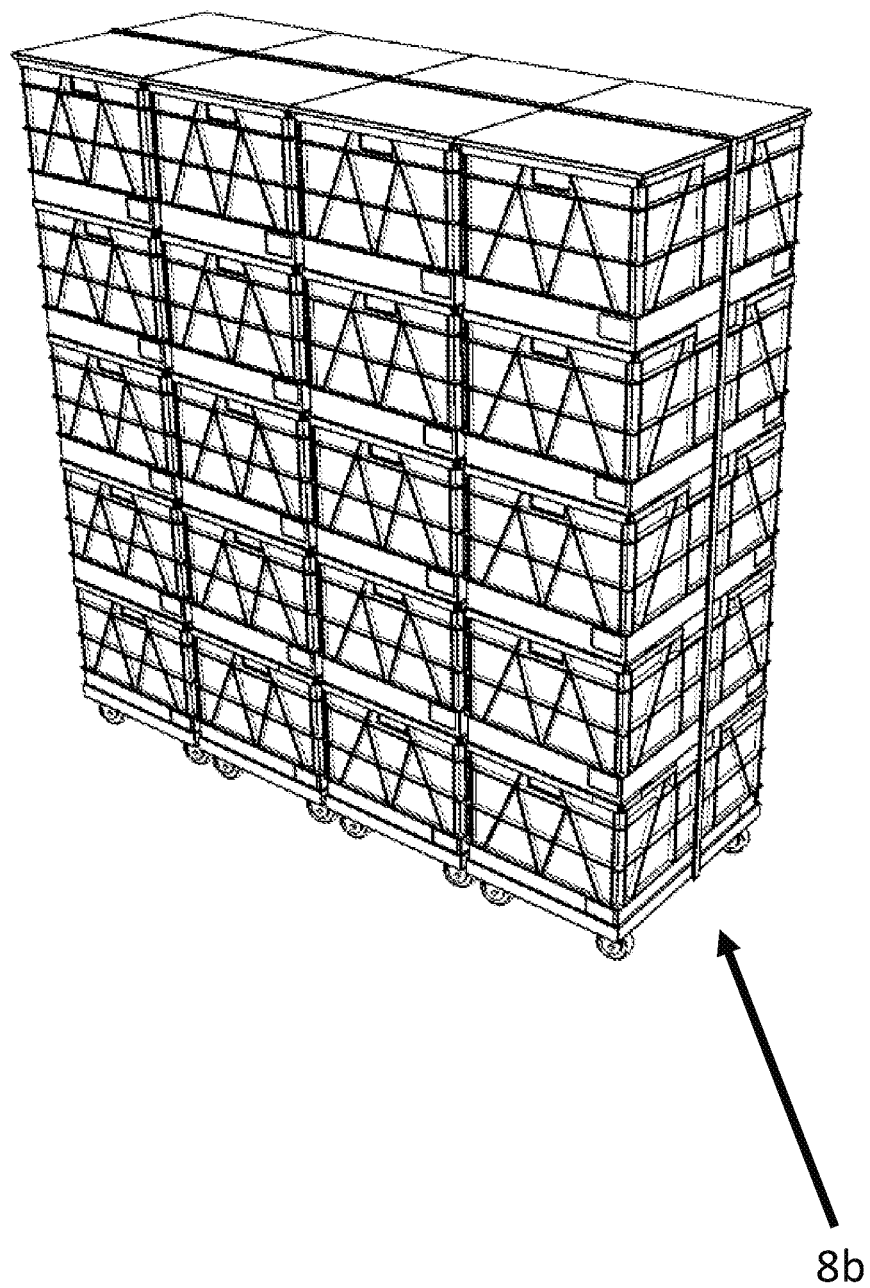

FIG. 12: is a schematic perspective view of an alternative arrangement wherein a single large dolly 9 is loaded with four stacks of five re-usable containers in a 4×1 configuration to form a single, stable, movable unit 8b.

Figure 13:
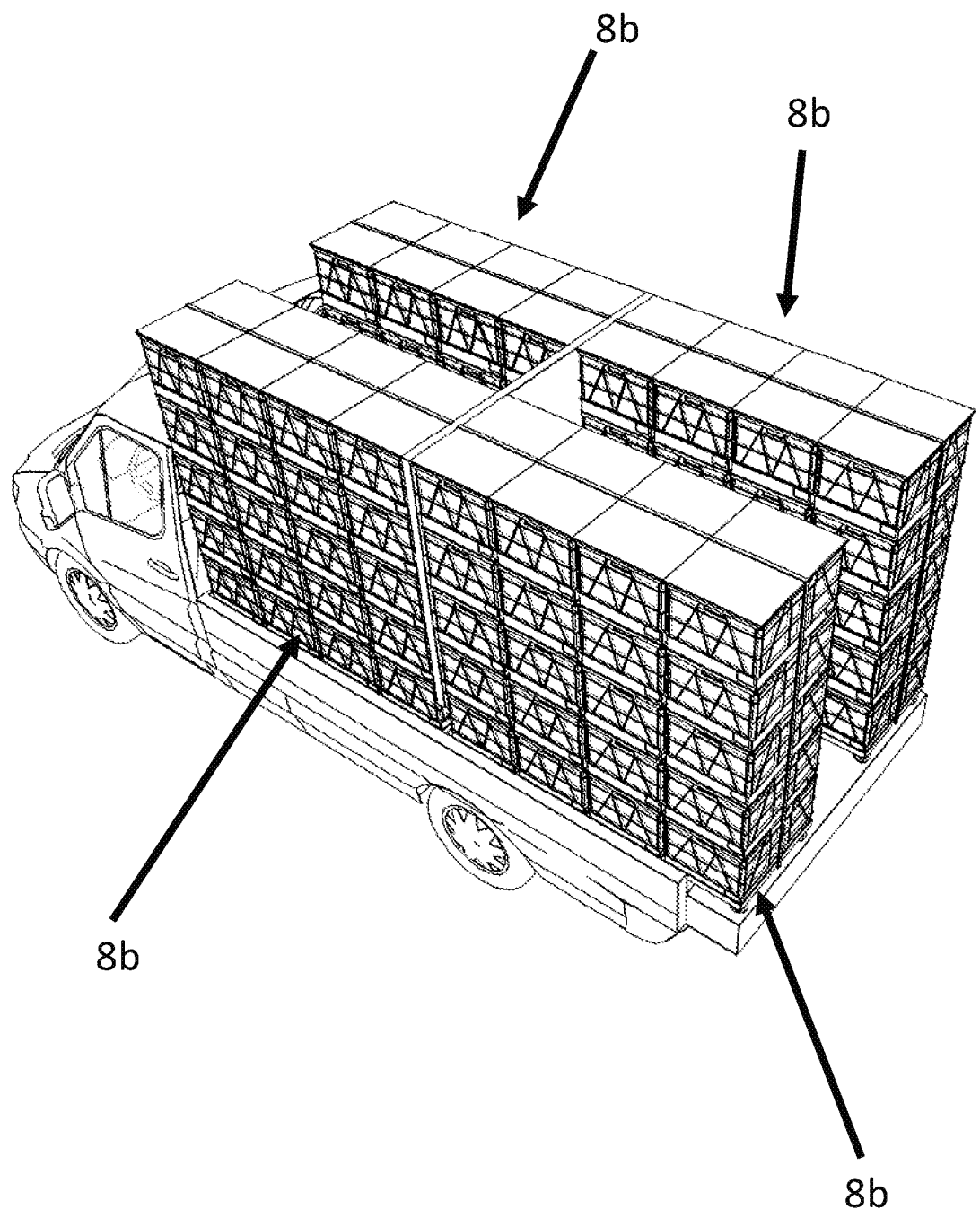

FIG. 13: is a schematic perspective view of a delivery vehicle showing how multiple movable units 8b may be arranged inside the delivery vehicle to allow access to each of sixteen stacks; and Referring to FIG. 3 the re-usable containers of the present invention comprise open topped crates or boxes having five closed sides. The containers are shaped and sufficiently strong to allow several filled containers to be stacked on top of one another to form a single stack.

The containers in a single stack may be of the same or of different lengths, widths and heights.

The open top or sixth side enables the containers to be quickly and easily filled prior to stacking, with one or more items, goods, bags or parcels to form a part of an order, a single order or several orders.

The containers of the present invention may be moved manually, using bin stackers or Bots or any suitable technology or method.

Optionally the containers have openings 10 on one or more sides to provide hand holds which are helpful when moving the containers and during stacking and de-stacking.

The size and shape of these openings 10 is dependent on whether the containers are intended to be moved manually, using bin stackers or Bots or any suitable technology or method or combinations thereof.

In the preferred embodiment shown in FIG. 3a the container comprises an inner part 1 and an outer part 2. The inner part can be moved from a first position where it is located within the outer part to a second position where a substantial part of the inner part extends beyond the outer part, to open and close the re-usable container. The movement of the inner part from the first retracted position to the second extended position may be effected by sliding the inner part out of the outer part like a drawer.

Although it is possible to move the inner part to the second extended position prior to stacking the container is generally in the first, closed or retracted position when it is being filled prior to stacking.

After the container has been filled and stacked the contents of any container within the stack are accessible by moving the inner part to the second extended position without the need for de-stacking.

A locking mechanism may be provided to secure the inner part in the first, closed or retracted position.

Optionally one or more side of the inner part has an opening 12 to allow the contents of the inner part to be accessed from two or more directions.

In another preferred embodiment shown in FIG. 3c the re-usable container includes one or more movable side or hatch 3 which can be moved to allow the contents of the container to be accessed without the need for de-stacking.

Preferably the side or hatch 3 is slidable or hinged. More preferably the side or hatch 3 is located on the short side or sides of the re-usable container.

In a preferred embodiment the re-usable containers have one or more internal hooks on which bags can be hung or otherwise secured.

As shown in FIGS. 4, 10 and 12 one or more stack are loaded onto one or more dolly 7 or 9 to form a single movable unit 8a or 8b.

Referring to FIGS. 10 and 12 four stacks are joined together to form a single movable unit 8a or 8b.

Any other number of stacks such as 2, 3, 5, 6, 7, 8, 9 or more can be joined together to form a single stable movable unit.

If multiple separate dollies 7 are used to form a single movable unit 8a as shown in FIG. 10 the dollies are securely joined together by one or more interlocking mechanism.

Referring to FIGS. 4 and 10 preferably the one or more stacks of multiple re-usable containers are held together using one or more strap 6.

The strap or straps are arranged horizontally and or vertically around the stack.

Optionally a lid may be placed on the top container in a stack before the strap 6 is applied to increase the strength of the container or to help stabilize the stack or to prevent moisture from any refrigeration system from dripping onto the container's contents.

One or more single movable unit can be rapidly loaded directly onto a delivery vehicle 15 at the order picking facility.

Alternatively in a hub-and-spoke system one or more single movable unit can be rapidly loaded onto a distribution vehicle at the order picking facility and conveyed to a subsidiary site.

At the subsidiary site one or more of the single movable units can be rapidly loaded onto a onto a delivery vehicle without the need for de-stacking.

FIGS. 6-9 illustrate how eight dollies may be arranged and re-arranged inside a delivery vehicle. This allows easy access to the contents of any container in each of the eight stacks, and permits orders to be accessed and delivered in any sequence and removes the need for a predetermined delivery sequence.

Many variations and modifications not explicitly described above are also possible without departing from the scope of the invention as defined in the appended claims.

The invention claimed is:

1. A method for handling goods in a goods handling system having a plurality of re-usable, stackable containers, wherein at least one of the containers includes an inner part and an outer part, the inner part being slidably engaged within the outer part and slidable between a first position in which the inner part is located substantially within the outer part and a second position in which a substantial portion of the inner part extends beyond the outer part, whereby an interior of the at least one container is accessible by relative sliding movement of the inner part and the outer part into the second position, an open top and five closed sides including four side walls and a closed base located substantially at bottoms of the four side walls, three of the four side walls being provided by the outer part, the base and one of the four side walls being provided by the inner part and each of the side walls having substantially a same height such that when the inner part is in the first position the side wall provided by the inner part will be positioned adjacent to two of the three side walls provided by the outer part so that the four side walls are substantially continuous and define an aperture of the open top of the container, the inner part and the outer part being configured such that when the container is stacked with one or more containers, goods stored therein will remain within the container, and wherein the inner part includes two inner part side walls arranged perpendicular to the base, the method comprising:

loading goods within the at least one container;

stacking the at least one container among the plurality of containers;

accessing goods within the at least one container, while it remains stacked among the plurality of containers, by sliding the interior part of the at least one container into the second position;

removing goods from the at least one container, wherein at least one of the two inner part side walls have an opening configured to allow access to goods arranged in an interior of the inner part; and removing goods from the at least one container through the opening in the side wall.

2. A method for handling goods in a goods handling system having a plurality of re-usable, stackable containers, wherein at least one of the containers includes an inner part and an outer part, the inner part being slidably engaged within the outer part and slidable between a first position in which the inner part is located substantially within the outer part and a second position in which a substantial portion of the inner part extends beyond the outer part, whereby an interior of the at least one container is accessible by relative sliding movement of the inner part and the outer part into the second position, an open top and five closed sides including four side walls and a closed base located substantially at bottoms of the four side walls, three of the four side walls being provided by the outer part, no portion of the at least one container extending above a plane level with uppermost edges of the three side walls, the base and one of the four side walls being provided by the inner part and each of the side walls having substantially a same height such that when the inner part is in the first position the side wall provided by the inner part will be positioned adjacent to two of the three side walls provided by the outer part so that the four side walls are substantially continuous and define an aperture of the open top of the container, the inner part and the outer part being configured such that when the container is stacked with one or more containers, goods stored therein will remain within the container, and wherein the inner part includes two inner part side walls arranged perpendicular to the base, the method comprising:

loading goods within the at least one container;

stacking the at least one container among the plurality of containers;

accessing goods within the at least one container, while it remains stacked among the plurality of containers, by sliding the interior part of the at least one container into the second position; and removing goods from the at least one container.

3. The method for handling goods according to claim 2, comprising:

stacking the at least one container among the plurality of containers into at least two stacks of containers.

4. The method for handling goods according to claim 3, comprising:

arranging the at least two stacks on at least one dolly.

5. The method for handling goods according to claim 4, wherein the at least one dolly incudes two or more dollies, the method comprising:

releasably locking the two or more dollies together.

6. The method for handling goods according to claim 4, comprising:

moving the at least one dolly including the at least two stacks as one unit.

7. The method for handling goods according to claim 3, comprising:

securing the at least two stacks of containers together by at least one strap.

8. The method for handling goods according to claim 3, comprising:

loading the at least two stacks of containers on a vehicle and accessing and removing the goods within the at least one container, while it remains stacked among the plurality of containers on the vehicle.

9. The method for handling goods according to claim 2, wherein removing the goods from the at least one container takes place while the at least one container is stacked below another container among the plurality of containers.

10. The method for handling goods according to claim 2, comprising:

removing goods from the at least one container through the open top of the at least one container.

11. The method for handling goods according to claim 2, wherein at least one of the two inner part side walls have an opening configured to allow access to goods arranged in an interior of the inner part, the method comprising:

removing goods from the at least one container through the opening in the side wall.

12. The method for handling goods according to claim 2, wherein an inner wall of the side walls of the inner part includes at least one hook, the method comprising:

securing goods loaded within the at least one container using the at least one hook.

* * * * *